(12) United States Patent
Töpfer et al.

(10) Patent No.: US 11,555,539 B2
(45) Date of Patent: Jan. 17, 2023

(54) ACTUATOR FOR AUTOMOTIVE APPLICATIONS

(71) Applicant: Kiekert AG, Heiligenhaus (DE)

(72) Inventors: Claus Töpfer, Sindelfingen (DE); Winfried Schlabs, Bochum (DE); Tim Sonnenschein, Wuppertal (DE); Benjamin Djedovic, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 16/760,952

(22) PCT Filed: Oct. 17, 2018

(86) PCT No.: PCT/DE2018/100854
§ 371 (c)(1),
(2) Date: Jul. 9, 2020

(87) PCT Pub. No.: WO2019/086068
PCT Pub. Date: May 9, 2019

(65) Prior Publication Data
US 2021/0180674 A1    Jun. 17, 2021

(30) Foreign Application Priority Data

Nov. 6, 2017    (DE) .................... 10 2017 125 819.1

(51) Int. Cl.
*F16H 25/20* (2006.01)
*F16H 55/08* (2006.01)
(Continued)

(52) U.S. Cl.
CPC ........... *F16H 55/08* (2013.01); *E05F 15/614* (2015.01); *F16H 1/08* (2013.01); *F16H 19/08* (2013.01);
(Continued)

(58) Field of Classification Search
CPC .......... F16H 55/08; F16H 25/20; F16H 19/08; F16H 55/06; F16H 1/08;
(Continued)

(56) References Cited

U.S. PATENT DOCUMENTS 4,310,930 A * 1/1982 Goldowsky ............. F04C 9/002
623/3.1
5,813,171 A * 9/1998 Piltingsrud ............. E05F 15/63
49/139
(Continued)

FOREIGN PATENT DOCUMENTS

DE 102008054398 A1 6/2010
DE 102009046209 A1 5/2011
(Continued)

OTHER PUBLICATIONS

Translation of International Search Report dated Jan. 25, 2019 for PCT/DE2018/100854.

*Primary Examiner* — William C Joyce
*Assistant Examiner* — Gregory Robert Weber
(74) *Attorney, Agent, or Firm* — Renner, Otto, Boisselle & Sklar, LLP

(57) ABSTRACT

An application, in particular for motor vehicle closing devices. The basic design of the motor vehicle has an electric motor and an actuating element which is acted upon by the electric motor directly or indirectly via a powertrain. The powertrain is provided with at least one Evoloid toothing. According to the invention, a drive shaft of the electric motor is equipped with an Evoloid pinion which meshes with an Evoloid output gear at the input of the powertrain, thereby directly producing the Evoloid toothing.

11 Claims, 3 Drawing Sheets

(51) Int. Cl.
*E05F 15/614* (2015.01)
*F16H 1/08* (2006.01)
*F16H 19/08* (2006.01)
*F16H 55/06* (2006.01)

(52) U.S. Cl.
CPC ............ *F16H 25/20* (2013.01); *F16H 55/06* (2013.01); *E05Y 2201/434* (2013.01); *E05Y 2201/702* (2013.01); *E05Y 2201/704* (2013.01); *E05Y 2900/531* (2013.01); *E05Y 2900/546* (2013.01); *F16H 2025/2081* (2013.01)

(58) Field of Classification Search
CPC ..... F16H 2025/2081; F16H 2025/2084; F16H 2025/2062; E05F 15/614; E05Y 2201/702; E05Y 2201/434
See application file for complete search history.

(56) References Cited

U.S. PATENT DOCUMENTS

| | | | |
|---|---|---|---|
| 6,139,070 A * | 10/2000 | Piltingsrud | E05B 17/0029 292/144 |
| 6,167,770 B1 * | 1/2001 | Nass | E05B 81/20 292/216 |
| 7,191,678 B2 * | 3/2007 | Schunke | H02K 7/116 74/413 |
| 9,309,813 B2 * | 4/2016 | Nau | F02D 9/1065 |
| 9,791,026 B2 * | 10/2017 | Saxstetter | F16H 55/0806 |
| 2011/0180737 A1 * | 7/2011 | Moench | F16K 3/085 251/248 |
| 2014/0230586 A1 | 8/2014 | Saxstetter et al. | |
| 2017/0211699 A1 * | 7/2017 | Sasanuma | F16K 31/04 |
| 2019/0063568 A1 * | 2/2019 | Laskovy | F16H 25/2204 |
| 2020/0003287 A1 * | 1/2020 | Holzberger | B60G 17/0272 |

FOREIGN PATENT DOCUMENTS

| | | | | |
|---|---|---|---|---|
| DE | 102010003044 A1 * | 9/2011 | ........... | F16H 37/041 |
| DE | 102010003044 A1 | 9/2011 | | |
| DE | 202011106149 U1 | 1/2013 | | |
| DE | 102015204328 A1 | 9/2015 | | |
| EP | 1363809 B1 | 12/2005 | | |
| JP | 2013509524 A | 3/2013 | | |
| WO | 2013045104 A1 | 4/2013 | | |

* cited by examiner

ACTUATOR FOR AUTOMOTIVE APPLICATIONS

FIELD OF INVENTION

The invention relates to an actuator for automotive applications, in particular for motor vehicle closing devices, comprising an electric motor and an actuating element which is acted upon indirectly or directly by the electric motor via a powertrain, at least one Evoloid toothing being provided in the powertrain.

BACKGROUND OF INVENTION

Actuators for automotive applications are used, for example, to adjust an exterior mirror, to ensure a seat adjustment, to perform a headlamp adjustment or even to set or adjust the windscreen wipers. Moreover, in principle, flap elements, such as for example a tailgate, a boot lid, a motor vehicle door, an engine hood or the like, can be acted upon by means of such actuators.

In addition to these general automotive applications for actuators, these actuators are also used and put into practice in connection with motor vehicle closing devices. Such motor vehicle closing devices are, for example, a closing drive for a motor vehicle door or a tailgate. Moreover, so-called servo latch holders can also be moved by such actuators, in order likewise to close a motor vehicle door. In addition, applications in the interior of a motor vehicle door latch are conceivable, for example in such a way that individual latch members are acted upon, for example a locking member or central locking member. Furthermore, amongst other things, fuel filler flaps or charging sockets in the case of electric vehicles can also be locked by means of the actuator.

All of the fields of application known in the art for such actuators often require a compact design of actuator, because the installation conditions are confined. Thus, in the context of the generic DE 10 2010 003 044 A1 a multistage transmission device for adjustment of a component in a motor vehicle is described. The component may be a seat adjustment, an exterior mirror adjustment or also a headlamp adjustment and in principle also a window controller or other elements in or on the motor vehicle. The known multistage transmission device operates with a first gear stage consisting of a worm and a spur gear or worm gear which meshes with the worm. Moreover, a second gear stage is implemented.

The second gear stage consists of an Evoloid pinion and an output gear which meshes with the Evoloid pinion. The spur gear or worm gear which engages in the worm is coupled to the Evoloid pinion. The Evoloid pinion may be a plastic pinion. In this way a compact transmission device is provided, by which high torques can also be transmitted.

In the further prior art according to WO 2013/045104 A1 a spindle drive for motor-powered adjustment of an adjusting element of a motor vehicle is described. In this connection a planetary gear transmission with a rotatable sun gear and, coaxially therewith, a rotatable planetary gear support is also implemented. The engagement between the sun gear and the at least one planetary gear of the planetary gear support is configured as an Evoloid toothing. In this way the necessary installation space overall should be reduced in the direction of the longitudinal axis of the drive.

Finally, the prior art according to EP 1 363 809 B1, which is also relevant, relates to an actuator for motor vehicle exterior mirror adjustment. For this purpose, a mirror adjusting member is implemented which is coupled to the electric motor via the powertrain. The powertrain has a main gear which is provided in the powertrain in the vicinity of the mirror adjusting member. The main gear is connected to an Evoloid toothing via a pinion.

Consequently, the prior art shows quite generally actuators for automotive applications which provide at least one Evoloid toothing in the powertrain. In this connection the Evoloid toothing is implemented centrally in the powertrain or adjacent to the actuating element, in order as a rule to provide higher transmission ratios at the output of the powertrain by means of such an Evoloid toothing. On the other hand, in the prior art the powertrain at its input typically operates with a worm gear. This is where the invention starts from.

SUMMARY OF INVENTION

The technical problem underlying the invention is to provide an actuator for automotive applications such that, by comparison with the previous prior art, an even more compact design is achieved and in particular high transmission ratios are also provided in only one single gear stage.

In order to solve this technical problem, within the context of the invention a generic actuator for automotive applications is characterized in that a drive shaft of the electric motor is equipped with an Evoloid pinion which meshes with an Evoloid output gear, directly producing the Evoloid toothing at the input of the powertrain.

Within the context of the invention the design can be chosen and implemented so that the electric motor, by means of its drive shaft via the Evoloid pinion located thereon, meshes directly with the Evoloid output gear, which for its part acts upon the actuating element. In other words, according to the invention single-stage transmission designs can be implemented using the Evoloid toothing. For this purpose the Evoloid toothing is provided at the input of the powertrain. At the output of the powertrain, the powertrain acts on the actuating element, which carries out the required actuating movements. These actuating movements may be both rotational actuating movements and also translational actuating movements and in principle also combinations thereof.

Moreover, it is within the context of the invention that, in addition to the Evoloid toothing at its input, the powertrain has or can have a supplementary transmission. The supplementary transmission can be equipped with one or more further Evoloid toothings. The supplementary transmission can also have gear stages with spur gear toothings or oblique toothings in addition to or instead of Evoloid toothings.

In this way a particularly compact embodiment of the actuator according to the invention is generally provided. One or more gear stages can be omitted on the basis of the Evoloid toothing used. As a result, additionally, the actuator according to the invention has or can have small dimensions. Moreover, as a result the total weight of the actuator can be decreased.

In addition, such an Evoloid toothing has a better effectiveness in the transmission of the drive power from the drive shaft to the Evoloid output gear than a straight toothing. Moreover, Evoloid toothings have better acoustics with less operating noise than spur gears with straight toothings, so that also the noise level is positively influenced. Quite apart from this, such Evoloid toothings are not usually designed to be self-locking, so that if required they are moved manually and in particular can be reset manually.

This is necessary and desirable in particular in the event that the actuator has failed and the actuating element acted upon thereby in the exemplary case carries out or must carry out the required actuating movement manually. Since in the event of such a manual actuating movement the actuator and consequently the electric motor including the powertrain must be moved therewith, any instances of self-locking which are not observed according to the invention play a special role.

The Evoloid pinion preferably has three teeth. In principle, however, different numbers of teeth are also possible, for example only two or even only one single tooth or four or six teeth. Moreover, the so-called normal modulus of the Evoloid pinion is 0.5 and more. The modulus of a gear should generally be understood to be a measure of the size of the teeth. The modulus usually clearly designates the ratio between the diameter of the relevant gear and the number of teeth. In the case of an Evoloid pinion the normal modulus is defined as the modulus in the normal section, that is to say in an area perpendicular to the flank lines of the toothing. Here the invention makes use of a relatively small normal modulus of at least 0.5. As a result high torques can be transmitted and no excessively large force peaks are observed in the Evoloid pinion so that at this point plastics can actually be implemented.

In other words, the powertrain can be made up at least partially of plastic gears. The same applies to the transmission optionally provided in the powertrain. The Evoloid pinion is preferably designed as a plastic pinion. In this connection, and also in other respects, it has generally proven itself if the relevant Evoloid pinion is formed on a spigot. As a result, the spigot with the Evoloid pinion can be fitted onto the drive shaft of the electric motor. As a consequence thereof the assembly is particularly simple. In this case, the spigot with the Evoloid pinion can be releasably or even non-releasably coupled to the relevant drive shaft of the electric motor. Moreover, a plastic pinion or a plastic gear has very smooth running, which is greater than in the case of a pinion or gear made of metal and otherwise having the same dimensions.

As usual, an Evoloid toothing is generally designated as an oblique involute toothing with a very large pitch angle of at least 30°. An Evoloid toothing or oblique involute toothing serves to produce large transmission ratios in a stage, the axes of the associated gears being additionally oriented parallel thereto. In this way according to the invention the drive shaft of the electric motor can be oriented so as to run in parallel with that of the actuating element. Moreover, as a result the reduction of any gear stages is kept to a minimum. In principle, the invention actually operates with one single gear stage, namely the Evoloid toothing, although the powertrain—as described—can still be equipped with a supplementary transmission.

The described actuator according to the invention can be used for all the previously mentioned automotive applications. In particular, however, embodiments in connection with motor vehicle closing devices are advantageously implemented. These can involve a closing drive, an opening drive, a servo latch holder or the like. Furthermore, by means of the described actuator it is possible to implement locking of flaps, such as for example locking of a fuel filler flap, or also locking of a charging socket in the case of an electric or hybrid vehicle.

BRIEF DESCRIPTION OF DRAWINGS

The invention is explained in greater detail with reference to drawings which show two exemplary embodiments. In the drawings.

DETAILED DESCRIPTION OF DRAWINGS

The drawings show an actuator for automotive applications. The automotive applications are in particular such applications in connection with and for motor vehicle closing devices, as has previously been explained in detail. For this purpose the basic design of the actuator includes an electric motor 1 and an actuating element 5.

Figure 1:
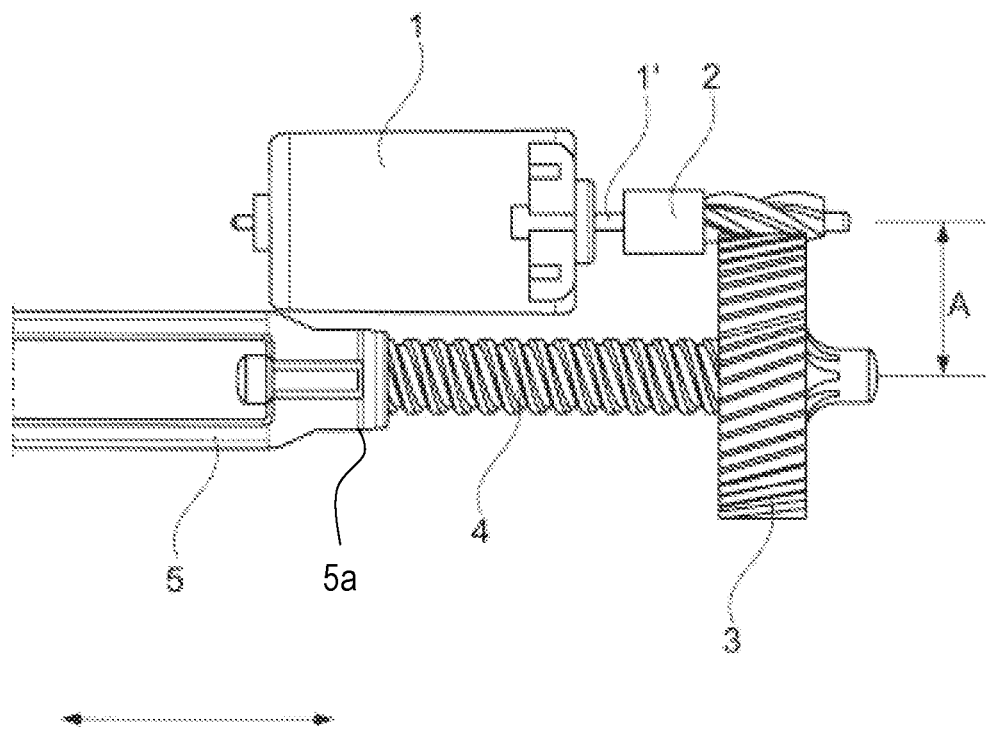
FIG. 1 shows a first exemplary embodiment of the actuator according to the invention in a schematic overview.

With reference to the exemplary embodiment according to FIG. 1 it can be seen that the motor vehicle has an electric motor 1 and an actuating element 5 which is acted upon indirectly or directly via a powertrain 2, 3, 4. The exemplary embodiment according to FIG. 1 shows an actuator designed as a microdrive. In the exemplary embodiment the actuating element 5 is acted upon directly by means of the powertrain 2, 3, 4, because only one Evoloid toothing 2, 3 for transmission of the rotary movements of a drive shaft 1' of the electric motor 1 is provided in the powertrain 2, 3, 4.

In the present case the Evoloid toothing 2, 3 is provided between an Evoloid pinion 2 and an Evoloid output gear 3. A threaded spindle 4 is connected in a rotatably fixed manner to the Evoloid output gear 3. A spindle nut 5a which, in the context of the variant according to FIG. 1, is integrated into the actuating element 5 or constitutes a component of the actuating element 5 is accommodated on the threaded spindle 4. In this way rotations of the threaded spindle 4 lead to the actuating element 5 being capable of carrying out the linear movements indicated in FIG. 1 or translational movements in the direction of double arrow.

It will be recognized that the drive shaft 1' at the output of the electric motor 1 is equipped with the Evoloid pinion 2. For this purpose the Evoloid pinion 2 is designed as a spigot. The spigot or the Evoloid pinion 2 is fitted as a whole onto the drive shaft 1' of the electric motor 1 and has a hollow bore for this purpose. Moreover, the spigot 2 may be additionally secured on the drive shaft 1' of the electric motor 1.

It will be recognized that the Evoloid toothing 2, 3 with its Evoloid pinion 2 and the Evoloid output gear 3 has in each case axes of rotation extending parallel to one another. In this way a particularly compact design is provided. The axes of rotation are oriented relative to one another with a spacing A. Moreover, as a result the design may be such that the drive shaft 1' of the electric motor 1 and the actuating element 5 overall likewise extend parallel to one another. This is because the actuating element 5 or the spindle nut moves in its longitudinal direction along the axis of rotation of the threaded spindle 4, which coincides with the axis of rotation of the Evoloid output gear 3. Accordingly, the same spacing A can be seen between the actuating element 5 or its longitudinal axis and the drive shaft 1' of the element 1.

Figure 2:
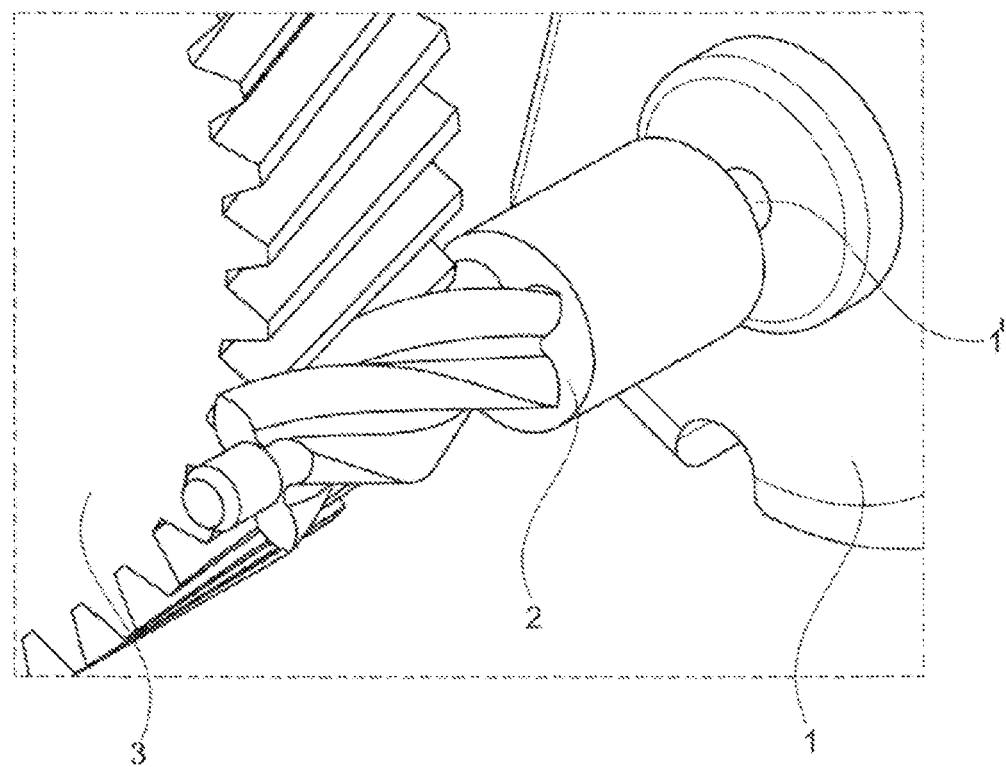
FIG. 2 shows a perspective view of the implemented Evoloid toothing.

Details of the Evoloid toothing 2, 3 are illustrated in FIG. 2. It will be recognized that the Evoloid pinion 2 in the exemplary embodiment is equipped with a total of four teeth. In general it is also possible to operate with fewer teeth for the Evoloid pinion 2. In the illustrated exemplary embodiment the Evoloid pinion 2 has three teeth. Moreover, the design in the exemplary case is such that the individual teeth of the Evoloid pinion 2 have a normal modulus of at least 0.4. On the other hand, the obliquely toothed Evoloid output gear 3 according to the exemplary embodiment has a total of forty teeth. The modulus or normal modulus of the Evoloid output gear 3 is likewise at least 0.4. Because of the described numbers of teeth for, on the one hand, the Evoloid pinion 2 and, on the other hand, the Evoloid output gear 3, in the exemplary embodiment a transmission ratio of the Evoloid toothing 2, 3 obtained in this way is 10.0 or 1 to 10, as indicated in FIG. 3 at this point.

In other words, one revolution of the Evoloid output gear 3 corresponds to ten revolutions of the Evoloid pinion 2. In general, other transmission ratios can be implemented at this point. The Evoloid toothing 2, 3 usually has a transmission ratio of at least 5.0 and preferably of 10.0 and more.

In the exemplary embodiment according to FIG. 1 a rotation of an output shaft of the electric motor 1 is transmitted directly to the actuating element 5 via the Evoloid output gear 3 connected in a rotatably fixed manner to the threaded spindle 4. Alternative designs can provide one or more intermediate shafts, which are also designed as Evoloid gear stages or also designed conventionally as spur gear stages, between the Evoloid output gear 3 and the threaded spindle 4.

Figure 3:
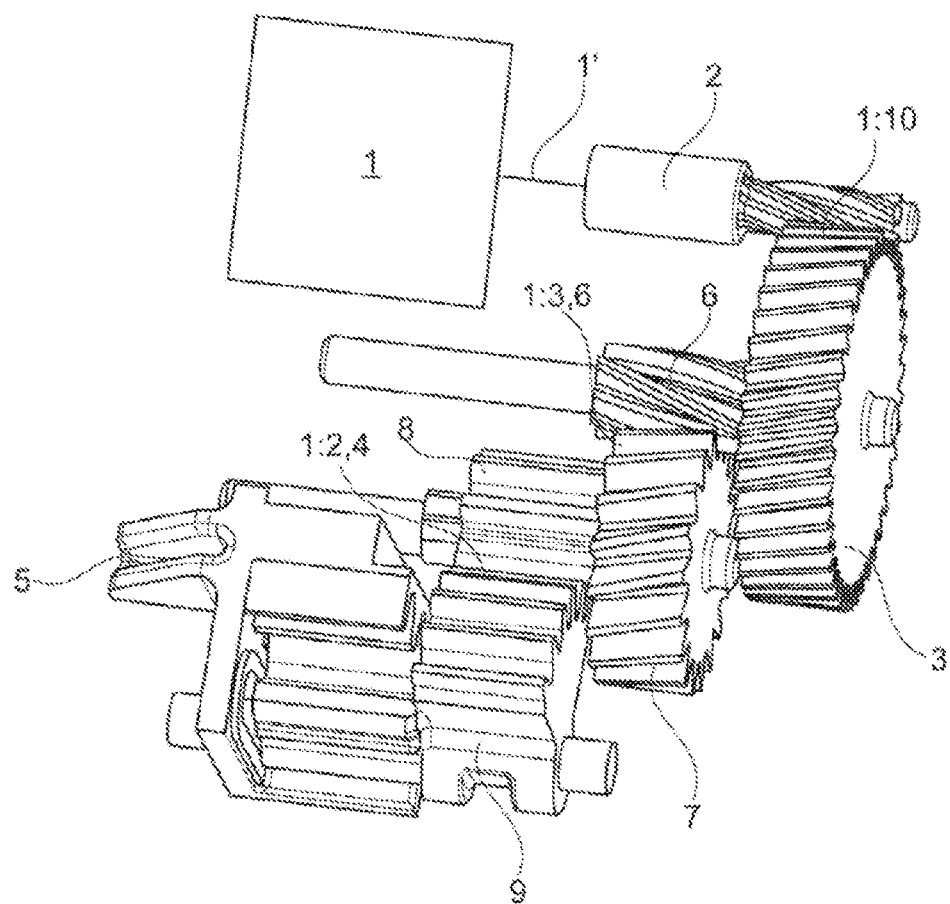
FIG. 3 shows a first exemplary embodiment of the actuator according to the invention.

The second exemplary embodiment according to FIG. 3 makes it clear that the powertrain 2, 3, 4 corresponding to the variant according to FIG. 1 can be equipped with a supplementary transmission 6, 7; 8, 9 in addition to the Evoloid toothing 2, 3 at its input. The transmission 6, 7; 8, 9 is made up of a first gear stage 6, 7 and a second gear stage 8, 9. FIG. 3 shows an actuator designed as a charging socket actuator which is provided in order to lock a charging socket of an electric car.

In the first gear stage 6, 7 an Evoloid pinion 6 is again used, which meshes with an obliquely toothed Evoloid output gear 7. At this point a transmission ratio of 3.6 or 1 to 3.6 is observed, as shown in FIG. 3. The Evoloid pinion 6 of the first gear stage 6, 7 is coupled in a rotatably fixed manner to the Evoloid output gear 3 of the Evoloid toothing 2, 3 at the input of the powertrain 2, 3, 4 or 2, 3.

An input gear 8 of the second gear stage 8, 9, which for its part meshes with an Evoloid output gear 9 of the second gear stage 8, 9, is connected to the Evoloid output gear 7 of the first gear stage 6, 7 in a rotatably fixed manner. The two gears 8, 9 of the second gear stage 8, 9 are designed as straight-toothed spur gears. On the other hand, the spur gears 2, 3 of the Evoloid toothing 2, 3, just like the spur gears 6, 7 of the first gear stage 6, 7, in each case have the already described Evoloid pinion 2 or 6 at the input end and the obliquely toothed Evoloid output gear 3 or 7 at the discharge end. In alternative configurations the first gear stage 6, 7 and the second gear stage 8, 9 can both be configured as Evoloid gear stages or as spur gear stages.

By means of the exemplary embodiment according to FIG. 3 it will be recognized that the Evoloid toothing 2, 3 at the input of the powertrain 2, 3, 4 or 2, 3 in conjunction with the transmission 6, 7; 8, 9 connected downstream provides overall a transmission ratio of approximately 86.4 or 1 to 86.4 (10×3.6×2.4), so that substantial transmission ratios can be implemented with a simultaneously compact design. Moreover, the possibility exists of designing the powertrain 2, 3, 4 or 2, 3, just like the transmission 6, 7; 8, 9, at least partially with plastic gears. According to the exemplary embodiment, at least the Evoloid pinion 2 and the Evoloid output gear 3 are manufactured from plastic. The further gears 6, 7; 8, 9 of the optional transmission 6, 7; 8, 9 connected downstream can also be manufactured from plastic. Overall, in the variant according to FIG. 3, the actuating element 5 indicated there is acted upon indirectly by the electric motor 1 via the powertrain 2, 3, 4, that is to say with the interposition of the transmission 6, 7; 8, 9. Moreover, in this variant the threaded spindle 4 is omitted, because in this case the actuating element 5 is acted upon by means of the Evoloid output gear 9 at the output of the second gear stage 8, 9.

The invention claimed is:

1. An actuator for automotive applications, the actuator comprising:
   an electric motor having a drive shaft with an Evoloid pinion;
   an actuating element; and
   a single-gear stage powertrain, wherein the actuating element is acted upon indirectly or directly by the electric motor via the powertrain at an output of the powertrain,
   wherein the powertrain includes an Evoloid output gear having Evoloid toothing, wherein the Evoloid pinion of the drive shaft has Evoloid toothing which meshes directly with the Evoloid toothing of the Evoloid output gear at an input of the powertrain, wherein the direct meshing of the Evoloid toothing of the Evoloid pinion and the Evoloid toothing of the Evoloid output gear form the single-gear stage, wherein the Evoloid pinion is formed on a spigot;
   wherein the powertrain further includes a spindle rotatably fixed to the Evoloid output gear, wherein the actuating element is configured to travel laterally along the spindle due to rotation of the spindle,
   wherein a spacing between axes of rotation of the Evoloid pinion and the Evoloid output gear is the same as a spacing between axes of rotation of the drive shaft and the actuating element, and
   wherein the electric motor, the drive shaft, and the actuating element are arranged on a same side of a rotational plane of the Evoloid output gear.

2. The actuator according to claim 1, wherein the spigot or the Evoloid pinion is fitted as a whole onto the drive shaft of the electric motor.

3. The actuator according to claim 1, wherein a transmission ratio of Evoloid toothing of the Evoloid pinion and the Evoloid output gear is at least 5.0.

4. The actuator according to claim 3, wherein the transmission ratio of the Evoloid toothing of the Evoloid pinion and the Evoloid output gear is 10.0 or more.

5. The actuator according to claim 1, wherein the Evoloid pinion has three teeth.

6. The actuator according to claim 1, wherein the drive shaft of the electric motor and the actuating element extend parallel to one another.

7. The actuator according to claim 1, wherein the Evoloid toothing of the Evoloid output gear is obliquely angled relative to an axis of rotation of the Evoloid output gear, and wherein the Evoloid toothing of the Evoloid pinion is obliquely angled relative to an axis of rotation of the Evoloid pinion.

8. The actuator according to claim 7, wherein the axis of rotation of the Evoloid output gear and the axis of rotation of the Evoloid pinion are parallel to each other.

9. The actuator according to claim 1, wherein the Evoloid toothing of the Evoloid output gear includes more teeth as compared with a number of teeth of the Evoloid toothing of the Evoloid pinion.

10. The actuator according to claim 9, wherein a transmission ratio of the Evoloid toothing of the Evoloid pinion relative to the Evoloid toothing of the Evoloid output gear is at least 5 to 1.

11. The actuator according to claim 1, wherein the spindle is a threaded spindle that is rotatably fixed to the Evoloid output gear and the actuating element further includes a spindle nut that is connected to the threaded spindle at an axial end opposite an end at which the Evoloid output gear is fixed.

\* \* \* \* \*